United States Patent [19]

Pusch

[11] 4,209,699
[45] Jun. 24, 1980

[54] INFRA-RED DETECTION SYSTEM FOR DETECTING LOW-FLYING OBJECTS

[76] Inventor: Günter Pusch, Bannholzweg 12, 6903 Neckargemünd-Dilsberg, Fed. Rep. of Germany

[21] Appl. No.: 829,676

[22] Filed: Sep. 1, 1977

[51] Int. Cl.² .............................................. G01J 1/00
[52] U.S. Cl. .................................... 250/340; 250/342
[58] Field of Search .............. 250/338, 340, 342, 330, 250/333, 334

[56] References Cited

U.S. PATENT DOCUMENTS

| | | | |
|---|---|---|---|
| 4,063,093 | 12/1977 | Astheimer et al. | 250/342 |
| 4,129,780 | 12/1978 | Laughlin | 250/333 |

*Primary Examiner*—Davis L. Willis
*Attorney, Agent, or Firm*—Haseltine, Lake & Waters

[57] ABSTRACT

Method and apparatus for detecting the presence of low-flying objects including an infra-red sensor in which the electronic band width of the sensor is maintained relatively narrow during an initial detection phase, and when the distance between the target and the sensor decreases to a pre-determined value, the electronic band width is increased.

7 Claims, 1 Drawing Figure

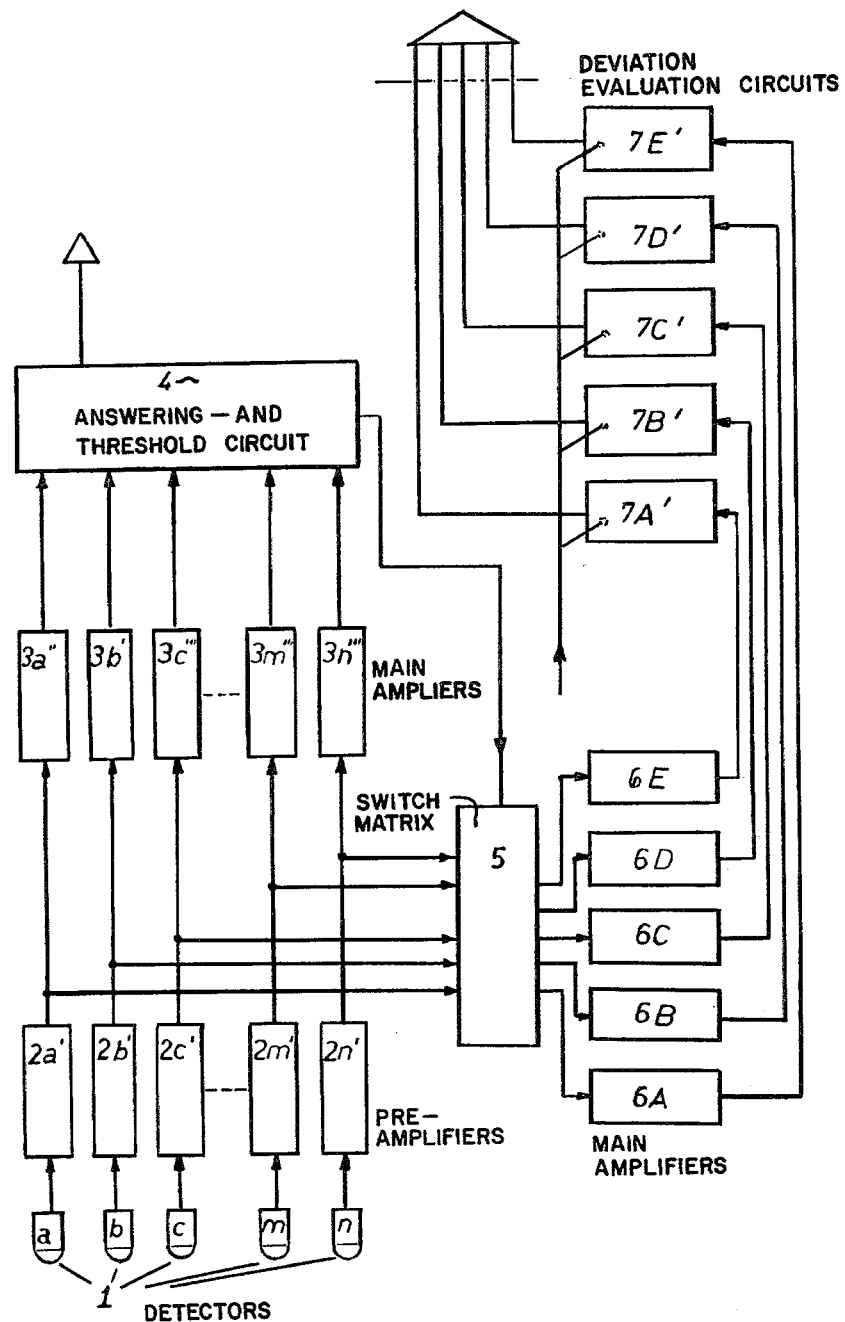

INFRA-RED DETECTION SYSTEM FOR DETECTING LOW-FLYING OBJECTS

FIELD OF THE INVENTION

The present invention relates to infra-red detection apparatus and methods for the detection in space of low flying objects.

PRIOR ART

In known infra-red sensors of infra-red detection apparatus, the noise signal which is composed of the self noise of the detector and background noise, is proportional to the square root of the electronic band width. In order to obtain high locating precision, however, with high sensing speeds of fine optical resolution, which is equivalent to discovery and precise locating of small targets in a scanned region of relatively large space angle, a wide electronic band width is a necessity. This brings about the drawback of a considerable reduction in the sensitivity and the range of the sensor. If, however, the electronic band width of the sensor is made relatively narrow and thus a high sensitivity and wide range is realized, the very important drawback is encountered that the precise location of the target can no longer be determined.

German Offenlegangsschrift 20 31 971 and the corresponding British Pat. No. 1,355,975 disclose an infra-red detection system in which a plurality of infra-red sensors are provided corresponding to respective small angles in space to be scanned and each of the sensors is connected to a main amplifier of relatively narrow band width.

OBJECT OF THE INVENTION

It is, an object of the present invention during the initial detection phase to assure a high sensitivity and wide range, and during the subsequent phase as the target comes closer to make the location of the target more precise.

BRIEF DESCRIPTION OF THE DRAWING

The above and other objects and advantages of the invention will appear more clearly from the following specification in connection with the accompanying drawing, the sole FIGURE of which is a block diagram of apparatus for carrying out the method according to the present invention.

SUMMARY OF THE INVENTION

According to the present invention, during the initial recognizing phase the electronic band width of the infra-red sensor is made relatively narrow and, upon approach of the target with increasing signal the electronic band width is increased. This is realized according to the present invention since at great distances and with small targets the relative target size is small with regard to the geometric resolution of the sensor. Under these conditions the physical law prevails that the beam power received by the sensor is inversely proportional to the square of the target distance. Thus, as the target approaches the signal produced greatly increases and the high sensitivity necessary for the inital detection phase is no longer necessary because under these conditions a sufficiently high signal to noise ratio is present. Under these circumstances, the electronic band width can be made considerable wider so that as the target approaches, the locating precision increases greatly.

A further feature of the invention is to improve the arrangement shown for instance in German Offenlegungsschrift 20 31 971 and the equivalent British Pat. No. 1,355,975, wherein all of the individual infra-red sensors for respective scanned angles in space are connected to main amplifiers of very narrow band width. If, according to the invention, in the scanned field of a sensor, a target is recognized, a corresponding amplifier with band width control which is dependent on the amplitude is switched on so that with increasing target signal (approaching target), constantly improving location of the target can be effected.

The switching on of the amplifier with band width control is preferably effected through the intervention of a threshold circuit and a switch assembly. The number of the evaluating devices can then be limited to the number of the maximum targets being recognized.

DETAILED DESCRIPTION

Referring now to the drawing in detail, detectors $1a$ to $1n$ are each associated with an infra-red sensor which receives signals in a relatively small angle in space. Pre-amplifiers $2a'$ to $2n'$ are connected to the detectors provided with a wide band to raise the amplitude of the signals to a level which subsequently can be further processed without a signal loss.

The pre-amplifiers 2, on the one hand, feed respective narrow band main amplifiers $3a''$ to $3n''$, and, on the other hand, feed a switch assembly or matrix 5. The information as to the particular sensor (partial space angle) in which a target was detected passes from the output of the narrow band main amplifier $3a''$ to $3n''$ through an answering and threshold circuit 4 to a corresponding indicating arrangement.

If the signal power increases beyond a predetermined magnitude, the threshold value circuit 4 triggers the switch matrix 5, and the corresponding signal is switched to a main amplifier 6A-6E. These main amplifiers are constructed with an amplitude dependent control of the band width. With increasing signal, the band width of the main amplifiers 6A-6E will, therefore, likewise increase whereby the output level will be kept approximately constant. With increasing band width, the build-up of these amplifiers will be effected considerably faster whereby the location of the target in the scanned field will be more precisely picked up, for instance, by interrupting or breaking the modulation pattern, as disclosed in the German Offenlegungsschrift 22 20 316 and corresponding British Pat. No. 1,431,792.

In deviation evaluation circuits $7A'-7E'$, in a manner known per se the more precise position of the target is ascertained in the scanned field of the corresponding space angle of each detector, and is likewise conveyed to an indicating device.

By means of the switch matrix 5, that detector in whose scanned angle in space a target is first picked up, is switched to the amplifier 6A and the deviation evaluation circuit $7E'$. That detector which picked up a second target is switched to 6B and $7D'$. Inasmuch as no more than four or five targets can simultaneously be fought, the above mentioned feature of the invention brings about a considerable decrease in the number of electronic parts.

The corresponding information as to location, obtained from the deviation signals are then conveyed to a firing control system for more precise aim of the target.

It is, of course, to be understood that the present invention is, by no means, limited to the specific showing in the drawing, but also comprises any modifications within the scope of the appended claims.

What I claim is:

1. In a method for detection of low flying objects in which an infra-red sensor detects the presence of a low-flying object in space and produces an output signal related thereto, the output signal is amplified, and the amplified output signal is employed to indicate the presence and location of the target, the improvement comprising amplifying the signal received from the sensor with a relatively narrow band width during an initial detection stage of the target, and increasing the band width of the amplified signal as the detected target approaches the sensor and increases the output signal thereof beyond a pre-determined level.

2. The method as claimed in claim 1 wherein the signal is amplified in the initial stage by a narrow band amplifier and when the output of the amplifier reaches a pre-determined level, the output signal from the sensor is switched to a relatively wide band amplifier.

3. The method as claimed in claim 2 wherein the wide band amplifier has a band width which varies in relation to the magnitude of the signal received thereby to provide a substantially constant output level.

4. Apparatus for detecting the presence of low-flying objects in a scanned region of space, said apparatus comprising detector means for detecting an object in the scanned region of space, relatively wide band pre-amplifier means connected to said detector means, a first set of selective amplifiers connected to said pre-amplifier means, switch means also connected to said pre-amplifier means, answering and threshold evaluating means connected to said selective main amplifiers for controlling the operation of said switch means, a second set of main amplifiers connected to said switch means, and evaluating circuit means connected to said second set of main amplifiers.

5. Apparatus as claimed in claim 4 wherein said first set of main amplifiers are of relatively narrow band and said second set of main amplifiers are of relatively wide band, said answering and threshhold evaluating means being operative to activate the switch means when the output signal from the first set of main amplifiers exceeds a pre-determined level to connect the pre-amplifier means to said second set of main amplifiers.

6. Apparatus as claimed in claim 5 wherein said second set of main amplifiers has a band width which increases with increasing input signal thereto.

7. Apparatus as claimed in claim 4 wherein said evaluating circuit means comprises a plurality of evaluating circuits equal in number to the number of amplifiers in said second set and respectively connected thereto.

* * * * *